United States Patent [19]

Perry

[11] Patent Number: 5,246,344
[45] Date of Patent: Sep. 21, 1993

[54] HELICOPTER ROTOR BLADE WITH IMPROVED PERFORMANCE CHARACTERISTICS

[75] Inventor: Frederick J. Perry, Yeovil, England

[73] Assignee: Westland Helicopters Limited, England

[21] Appl. No.: 895,663

[22] Filed: Jun. 9, 1992

[30] Foreign Application Priority Data

Jun. 14, 1991 [GB] United Kingdom ............... 9112835

[51] Int. Cl.$^5$ ............................................. B64C 27/46
[52] U.S. Cl. ..................................... 416/228; 416/237
[58] Field of Search ........... 416/223 R, 228 R, 228 A, 416/237 R, 237 A

[56] References Cited

U.S. PATENT DOCUMENTS

| | | | |
|---|---|---|---|
| 3,822,105 | 7/1974 | Jepson | 416/228 A |
| 4,077,741 | 3/1978 | Lowson et al. | |
| 4,248,572 | 2/1981 | Fradenburgh | 416/228 A |
| 4,314,795 | 2/1982 | Dadone | 416/237 A |
| 4,427,344 | 1/1984 | Perry | |
| 4,569,633 | 2/1986 | Flemming, Jr. | 416/228 A |
| 4,668,169 | 5/1987 | Perry | 416/223 R |
| 4,880,355 | 11/1989 | Vuillet et al. | 416/228 R |

Primary Examiner—Edward K. Look
Assistant Examiner—Christopher Verdier
Attorney, Agent, or Firm—Larson & Taylor

[57] ABSTRACT

In a helicopter rotor blade having a root end for attachment to a rotor head, a central portion of constant chord dimension and a tip portion having a chord dimension greater than that of the central portion, an outboard region of the central portion has a negative basic pitching moment coefficient, an inboard region of the central portion has a basic pitching moment coefficient more positive than that of the outboard region and the tip portion has a positive basic pitching moment coefficient.

4 Claims, 4 Drawing Sheets

HELICOPTER ROTOR BLADE WITH IMPROVED PERFORMANCE CHARACTERISTICS

BACKGROUND OF THE INVENTION

1. Field of the Invention

This invention relates to helicopter rotor blades.

2. Description of the Prior Art

EP-A-0037633 discloses a helicopter rotor blade having enhanced retreating blade performance achieved by using aerofoil sections having different aerodynamic characteristics throughout a blade span. Thus an aft-loaded aerofoil section having a high angle of attack capability (a nose down or negative basic pitching moment coefficient) is used in an outboard region to enhance retreating blade performance, and detrimental effects of such sections are balanced by an aerofoil section with a reflex camber line (a nose up or positive basic pitching moment coefficient) in an inboard region.

The extent of the aft-loading or negative basic pitching moment coefficient (and hence the stalling angle of the rotor blade) which can be utilised in the outboard region of the prior art blade depends on the amount of reflex camber that can be used in the inboard region, and the extent of the span of the inboard region which can be devoted to balancing the moments in the outboard region. This is governed to some extent by performance limitations which dictate that the reflex camber should not extend outboard beyond about 70 percent blade radius station.

To date this has limited the negative basic pitching moment coefficient usable in the outboard region of prior art blades according to EP-A-0037633 to about $-0.03$.

The exemplary embodiment of the rotor blade disclosed in EP-A-0037633 describes the distributed aerofoil section invention embodied in a rotor blade constructed according to GB-A-1538055. That blade has a parallel constant chord central portion and is characterised by a rearwardly swept tip portion which in plan has a forwardly extending leading edge portion, a rearwardly swept leading edge portion, a rearwardly swept extreme tip edge and a rearwardly swept trailing edge, resulting in a chord dimension in the tip portion greater than that of the central portion. The distributed aerofoil sections of EP-A-0037633 are incorporated in inboard and outboard regions of the central portion, and this combination provides rotor blades that have proved highly successful in producing large increases in the allowable rotor operating envelope, and which were a significant factor in the establishment of the world absolute speed record for helicopters of 249.10 mph (400.81 km/hr) set by a Westland Lynx helicopter in 1986.

An objective of this invention is to further improve the performance characteristics of such helicopter rotor blades.

SUMMARY OF THE INVENTION

Accordingly, in one aspect this invention provides a helicopter rotor blade having a root end for attachment to a rotor head, a central portion of constant chord dimension and a tip portion at the end of the central portion and defining a rotor radius during operation, the tip portion having a chord dimension greater than that of said central portion, an outboard region of said central portion having a negative basic pitching moment coefficient of absolute value not less than 0.02, an inboard region of said central portion having a basic pitching moment coefficient more positive than that of the outboard region characterised in that said tip portion has a positive basic pitching moment coefficient.

The basic pitching moment coefficient of the inboard region may be a positive basic pitching moment coefficient.

Preferably the absolute value of the basic pitching moment coefficient of the tip portion is between 0.5 and 1.0 times the basic pitching moment coefficient of the inboard region.

The negative basic pitching moment coefficient of the outboard region may be about $-0.09$.

In one embodiment the tip portion may have a positive basic pitching moment coefficient between $+0.015$ and $+0.03$, said inboard region may have a positive basic pitching moment coefficient of about $+0.03$ and the outboard region may have a negative basic pitching moment coefficient of about $-0.09$.

The inboard region of the central portion may extend to a rotor radial station of about 0.65 R, the outboard region may extend between 0.65 R and about 0.86 R and said tip portion may extend between 0.86 R and about 0.95 R.

In another aspect the invention provides a helicopter rotor blade having a root end for attachment to a rotor head, a central portion of constant chord dimension and a tip portion at the end of the central portion and defining a rotor radius during operation, the tip portion having a forwardly extending leading edge portion, a rearwardly swept leading edge portion, a rearwardly swept extreme tip edge and a rearwardly swept trailing edge whereby a chord dimension of the tip portion is greater than the chord dimension of the central portion, an outboard region of the central portion having a negative basic pitching moment coefficient of absolute value not less than 0.02, an inboard region of said central portion having a basic pitching moment coefficient more positive than that of the outboard region, characterised in that the tip portion has a positive basic pitching moment coefficient.

BRIEF DESCRIPTION OF THE DRAWINGS

The invention will now be described by way of example only and with reference to the accompanying drawings in which.

DETAILED DESCRIPTION OF THE DRAWINGS

Figure 1:
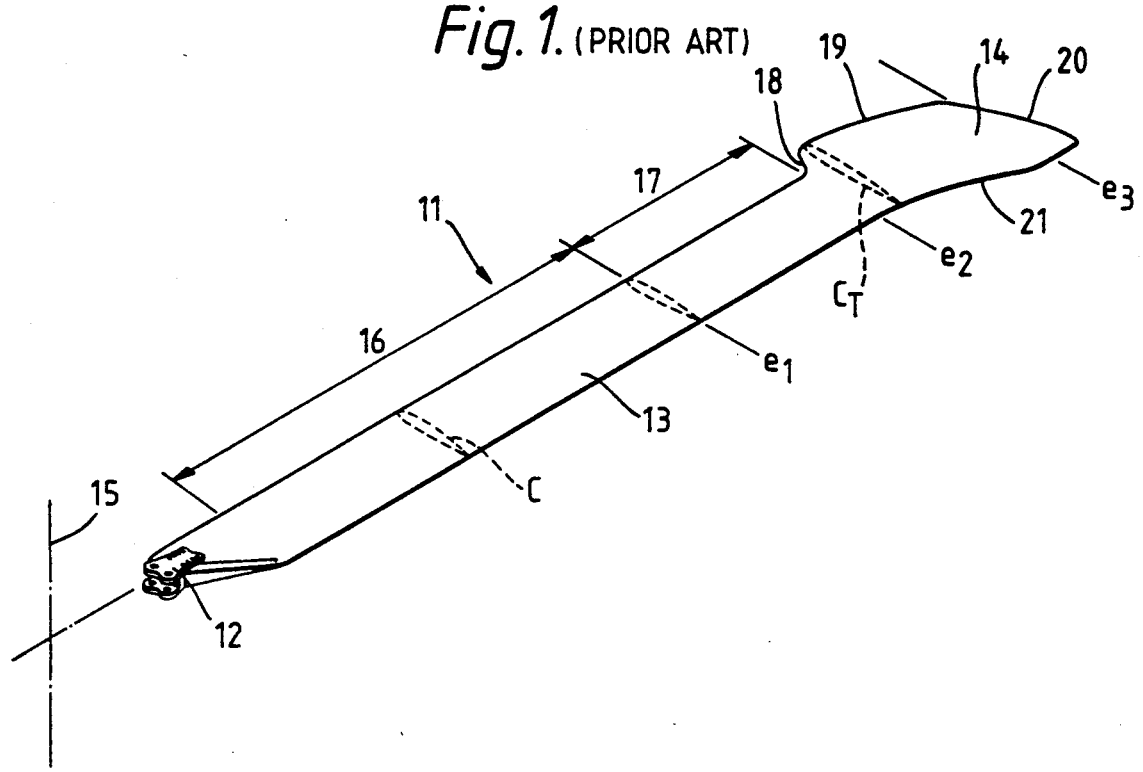
FIG. 1 is a perspective illustration of a prior art rotor blade.

Referring now to FIG. 1 a helicopter rotor blade 11 includes a root end 12, a central portion 13 and a tip portion 14. The root end 12 is adapted for attachment during operation to a rotor head (not shown) for rotation about a generally vertical axis 15. Central portion 13 has a constant chord dimension C and comprises an inboard region 16 extending to a radial station $e_1$ and an outboard region 17 extending to a radial station $e_2$.

The tip portion 14 is constructed in accordance with the teaching of GB-A-1538055 and includes a forwardly extending leading edge portion 18, a rearwardly swept leading edge portion 19, a rearwardly swept extreme tip edge 20 and a rearwardly swept trailing edge 21 defining a chord dimension $C_T$ which is larger than the chord C of the central portion 13. The blade is constructed according to the teaching of EP-A-0037633, whereby the central portion 13 employs aerofoil sections of high pitching moment ($C_m$) for helicopters but of moderate level when considering aerofoils in general; typically employing an aerofoil section having a negative basic pitching moment coefficient ($Cm_{o2}$) of $-0.03$ in the outboard region 17 balanced by an aerofoil section in the inboard region 16 having a basic pitching moment coefficient ($Cm_{o1}$) of $+0.03$ to provide a target moment balance of zero at the blade root 12. Thus, the ratio of $Cm_{o2}/Cm_{o1}$ for the prior art rotor blade is $-1$.

The prior rotor blades utilise in the tip portion 14 between radial station $e_2$ and a radial station $e_3$, an aerofoil section 14 which has traditionally employed a basic pitching moment coefficient (Cmo) of about zero, and such rotor blades have been used to great effect and made an essential contribution to the establishment of the aforementioned world speed record.

In considering further improvements to the performance achieved by such rotor blades, the inventor considered the features of the tip portion 14 especially in respect of its excellent high angle of attack performance in a retreating mode resulting from the planform. In particular, the increased chord dimension ($C_T$) associated with the forward step in the leading edge brings about a marked reduction in local incidence angles due to local induced flow effects. Additionally, as disclosed in GB-A-1538055, when separation does develop, the planform ensures that a stable, organised flow develops which prevents the tip portion 14 from participating in the retreating blade stall process. Since it is the planform and not the aerofoil section shape that controls the high angle of attack separation behaviour, the tip portion 14 has a reduced thickness to chord ratio to achieve improved advancing blade high Mach number performance without penalising retreating blade performance.

The inventor realised that the high angle of attack capabilities especially in respect of retreating blade performance achieved by the planform of tip portion 14 were compatible with high performance aft-loaded aerofoil sections, i.e. aerofoil sections having a negative basic pitching moment coefficient. He argued that if planform effects could make up for the high angle of attack performance losses usually associated with reflex camber aerofoil sections, (i.e. aerofoil sections having a positive basic pitching moment coefficient), the introduction of reflex camber aerofoil sections to produce a deliberate nose up moment in the tip portion 14 should be possible.

The use of an aerofoil section having a positive basic pitching moment coefficient in the tip portion 14 ($Cm_{oT}$) in addition to a similar section in the inboard region 16, might allow a significant increase in the negative basic pitching moment coefficient used in the outboard region 17 ($Cm_{o2}$) which should provide a further increase in the allowable maximum angle of attack in that region of the blade. Since the chord ($C_T$) of the tip portion 14 is greater than the chord C of the central portion and the dynamic head is quite high, only a modest amount of reflex camber (positive basic pitching moment coefficient) would be required to offset a substantial increase in negative basic pitching moment coefficient in the critical outboard region 17.

Consequently, when used in combination with the moment balance technique disclosed in EP-A-0037633, the use of an aerofoil section having a positive basic pitching moment coefficient in the tip portion 14 might allow a significant performance improvement to be achieved in the critical outboard region 17 of the central portion 13 of the rotor blade which determines the overall onset of retreating blade stall, provided that the higher moments could be tolerated.

Figure 2:
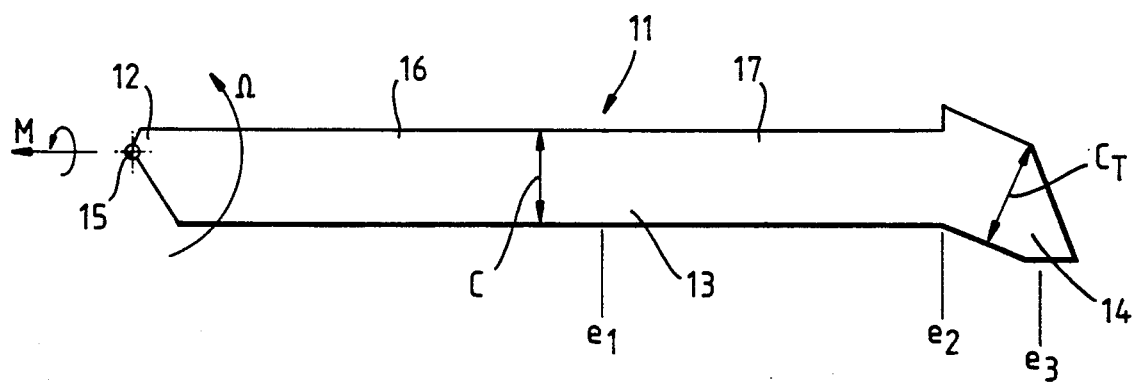
FIG. 2 is a schematic of a moment balance model used to calculate allowable moment levels in a rotor blade according to this invention.

An indication of allowable moment level was obtained from a simple aerodynamic moment balance model as shown in FIG. 2 in which like reference numerals have been used. The moment balance of the negative or nose down basic pitching moment coefficient ($Cm_{o2}$) in the critical outboard region 17 just inboard of the tip 14 is obtained by a reflex camber aerofoil section having a positive or nose up basic pitching moment coefficient ($Cm_{o1}$) in the inboard region 16 according to the prior teaching of EP-A-0037633 and additionally, in accordance with the teaching of the present invention, with a reflex camber aerofoil section having a positive or nose up basic pitching moment coefficient ($Cm_{oT}$) in the tip region 14.

Thus, preferably, the rotor blade of this invention has an inboard region 16 having a positive or nose up basic pitching moment coefficient ($Cm_{o1}$) an outboard region 17 having a negative or nose down basic pitching moment coefficient ($Cm_{o2}$) and a tip portion 14 having a positive or nose up basic pitching moment coefficient ($Cm_{oT}$).

In the following example the symbols used have the meaning ascribed below:

$\psi$—azimuth angle
$\mu$—advance ratio $V/\Omega R$
V—forward speed
$\Omega$—rotor rotational speed
R—blade radius
r—radial distance (variable)
$\rho$—air density
$\Omega R$—rotor tip speed
x—r/R nondimensional radius
e—a blade radial station (non-dimensional)
$\alpha$—incidence
$M_\infty$—free stream Mach number
M—basic aerodynamic moment
$\gamma$—sweep angle of tip
C—blade chord
$C_T$—tip chord
$C_L$—lift coefficient
$C_{LMAX}$—Maximum lift coefficient
Cm—pitching moment coefficient (positive nose up)
Cmo—basic pitching moment coefficient (positive nose up)
$Cm_{RES}$—residual pitching moment coefficient (positive nose up)

As explained in detail in EP-A-0037633, the rotor blade aerofoil section pitching moment can be represented by the equation:

$$Cm = \frac{Cmo}{\sqrt{1 - M_\infty^2}} + \Delta Cm_{RES}(M_\infty) + \Delta Cm(\alpha) \tag{1}$$

where Cmo is the basic aerofoil section pitching moment coefficient at low Mach number modified by the Prandtl-Glauert factor $\sqrt{1-M_\infty^2}$, and $\Delta Cm_{RES}(M_\infty)$ and $\Delta Cm(\alpha)$ are increments dependent on angle of attack and Mach number alone. EP-A-0037633 also explains that the term that can be controlled by design involves the basic pitching moment coefficient Cmo and, for algebraic simplicity in order to illustrate the basic principle, other terms are ignored in the following examples.

The basic aerodynamic moment (M) of the rotor blade is given by Cmo times the local dynamic head integrated over the blade:

$$M = \tfrac{1}{2}\rho c^2 \, R\overline{\Omega R}^2 \left\{ Cmo_1 \int_0^{e_1} (x + \mu \sin\psi)^2 dx + \right.$$

$$Cmo_2 \int_{e_1}^{e_2} (x + \mu \sin\psi)^2 dx +$$

$$CmoT \left(\frac{C_t}{C}\right)^2 \int_{e_2}^{e_3} (x + \mu \sin\psi)^2 \cos^2\gamma \, dx +$$

$$\left. CmoT \left(\frac{C_T}{C}\right)^2 \int_{e_2}^{e_3} (\mu \cos\psi)^2 \sin^2\gamma \, dx \right\} \quad 2$$

Integrating and collecting steady, $\sin\psi$ and $\cos 2\psi$ components of equation 2 provides:

$$M_{STEADY} = \tfrac{1}{2}\rho c^2 \, R\overline{\Omega R}^2 \left[ Cmo_1 \left[\frac{e_1^3}{3} + \frac{\mu^2 e_1}{2}\right] + \right.$$

$$Cmo_2 \left[\frac{e_2^3}{3} + \frac{\mu^2 e_2}{2} - \frac{e_1^3}{3} - \frac{\mu e_1}{2}\right] +$$

$$CmoT \left(\frac{C_T}{C}\right)^2 \left[\frac{e_3^3}{3} + \frac{\mu^2 e_3}{2} - \frac{e_2^3}{3} - \frac{\mu^2 e_2}{2}\right] \cos^2\gamma +$$

$$\left. CmoT \left(\frac{C_T}{C}\right)^2 \left[\frac{\mu^2}{2}(e_3 - e_2)\sin^2\gamma\right] \right] \quad 3$$

$$M_{SIN\psi} = \tfrac{1}{2}\rho c^2 \, R\overline{\Omega R}^2 \left[ Cmo_1(\mu e_1^2) + Cmo_2(\mu(e_2^2 - e_1^2)) + \right.$$

$$\left. CmoT \left(\frac{C_T}{C}\right)^2 (\mu(e_3^2 - e_2^2)\cos^2\gamma) \right] \quad 4$$

$$M_{\cos\psi} = -\tfrac{1}{2}\rho c^2 \, R\overline{\Omega R}^2 \left[ Cmo_1 \frac{\mu^2 e_1}{2} + Cmo_2 \frac{\mu}{2}(e_2 - e_1) + \right.$$

$$\left. CmoT \left(\frac{C_t}{C}\right)^2 \frac{\mu^2}{2}(e_3 - e_2)(1 - 2\sin^2\gamma) \right] \quad 5$$

The aforementioned prior art rotor blades are balanced to approximate a zero pitching moment blade for the once-per-revolution term ($\sin\psi$), at the blade root; however, a more general comparison can be made with a rotor blade of uniform planform and a low moment aerofoil section from the root end to the tip end. The new distributed aerofoil section rotor blade according to this invention could then be arranged so that moments were no larger than those of this conventional datum.

The most important component of the aerodynamic moment is the once-per revolution term ($\sin\psi$) since it twists the rotor blade in the same manner as cyclic pitch.

From equation 4 and assuming that Cmo is equal to a reference basic pitching moment coefficient $Cmo_R$ and that $e_1 = 1$, a reference once-per revolution moment equation can be derived. After some rearrangement:

$$\frac{M}{M_{REF}}(\sin\psi) = \frac{Cmo_1}{Cmo_R}\left[e_1^2 + \frac{Cmo_2}{Cmo_1}(e_2^2 - e_1^2) + \right.$$

$$\left. \frac{CmoT}{Cmo_1}(e_3^2 - e_2^2)\left(\frac{C_t}{C}\right)^2 \cos^2\gamma \right] \quad 6$$

It is to be noted that the ratio of the $\sin\psi$ component of moment to the reference moment $M_{REF}$ is always the same and is independent of forward speed ($\mu$, the advance ratio) in accordance with the teaching of EP-A-0037633. The size of the moment (M) depends on the proportions of the rotor blade particularly $e_1$, $e_2$, $e_3$ and $C_T/C$, and on the ratio of the pitching moment coefficients $Cmo_1$, $Cmo_2$ and $Cmo_T$.

Applying equation 6 to the geometry of the prior art blade provides that $C_T/C = 1.4$, $e_2 = 0.86R$, $e_3 = 0.95R$ and $\gamma \approx 25°$, and it is known that $e_1$ should not extend outboard beyond about 0.65R for good retreating blade stall performance. Taking as a reference pitching moment coefficient $Cmo_R = -0.015$ and taking the basic pitching moment coefficient of the inboard region of the existing blade i.e. $Cmo_1 = +0.03$; the ratio of $Cmo_1/Cmo_R = -2$.

The design problem faced by the inventor was to calculate the maximum value of $Cmo_2/Cmo_1$ for a given $Cmo_T/Cmo_1$, together with an acceptable value of $e_1$ which desirably but not essentially should be as far inboard as possible and certainly not outboard of 0.65R as previously noted.

Two assumptions were made concerning the basic pitching moment coefficient of the aerofoil section of the tip portion (14), namely that the aerofoil section of the tip portion (14) has the same nose-up basic pitching moment coefficient as the inboard region ($Cmo_T/Cmo_1 = 1$, i.e. $Cmo_T = +0.03$) or, if tip portion aerofoil section stalling characteristics were found to intrude on the high angle of attack performance of the tip portion 14, one half that of the inboard region ($Cmo_T/Cmo_1 = 0.5$, i.e. $Cmo_T = +0.015$), a very modest design requirement.

Figure 3:
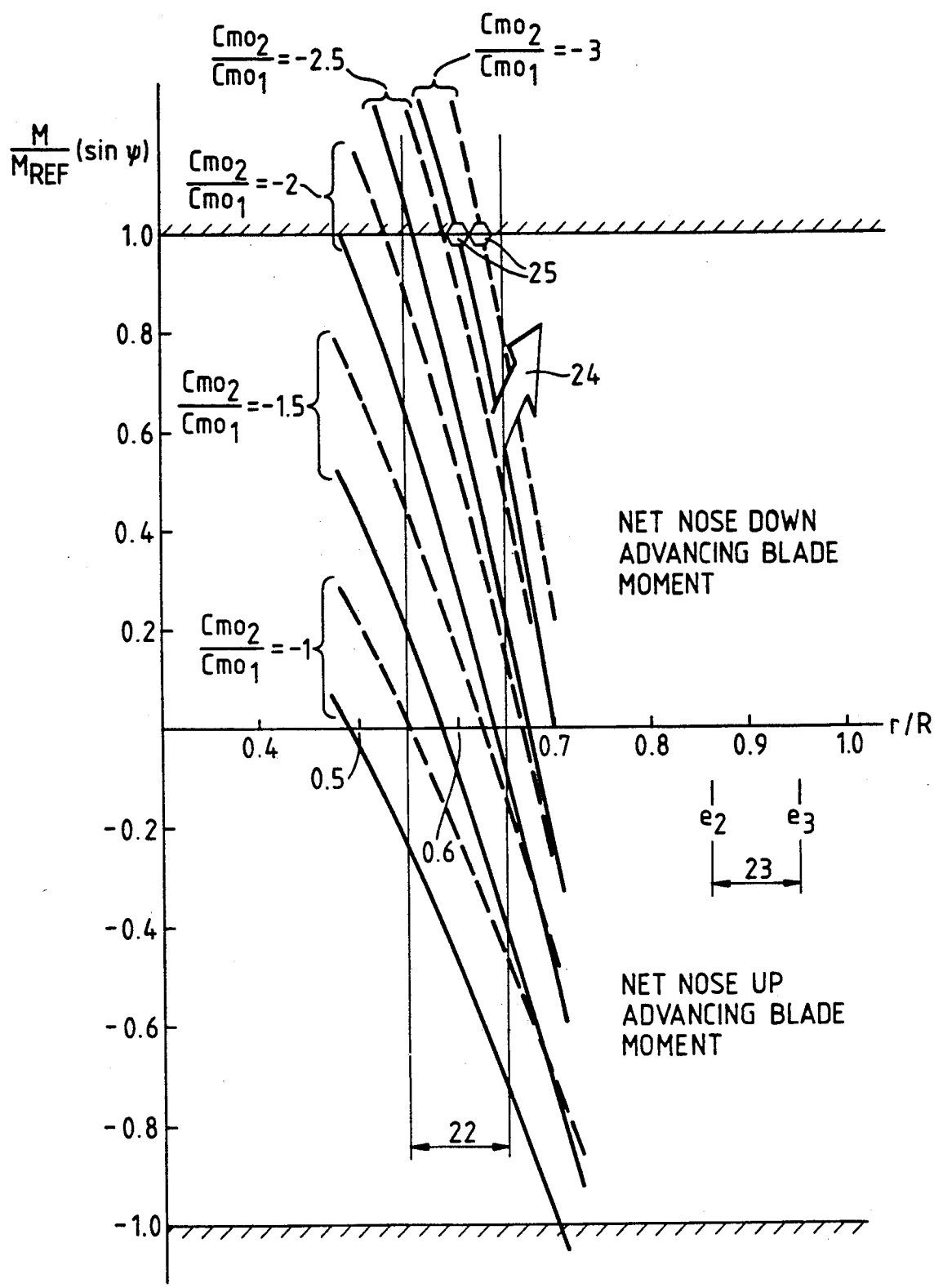
FIG. 3 is a graph plotting design locations for the rotor blade of this invention.

FIG. 3 plots blade radial station r/R against the once-per-revolution moment term $M/M_{REF}(\sin\psi)$ for various ratios of $Cmo_2/Cmo_1$ and shows $Cmo_T/Cmo_1 = 1$ in full line and $Cmo_T/Cmo_1 = 0.5$ in broken line for each ratio. The preferred range for the location of $e_1$ is shown at 22 and the location of the tip portion 14 at 23. The desirable direction for $Cmo_2$ is indicated by arrow 24.

Two solutions to the problem are identified at 25 in FIG. 3:
for $Cmo_T/Cmo_1 = 1$ then $e_1 = 0.61$ R and
for $Cmo_T/Cmo_1 = 0.5$ then $e_1 = 0.63$ R In both cases the maximum value for $Cmo_2/Cmo_1$ is $-3$ compared to $-1$ for the prior art blade. In other words, the aerofoil section used in the critical outboard region 17 of a rotor blade according to this invention can have up to approximately three times the basic nose-down or negative basic pitching moment coefficient $Cmo_2$ of the aerofoil section used in the outboard region of the prior art blade. This is achieved by incorporating an aerofoil section in the tip portion 14 having a modest nose-up basic pitching moment coefficient in addition to that used in the inboard region 16 of prior art rotor blades.

Figure 4:
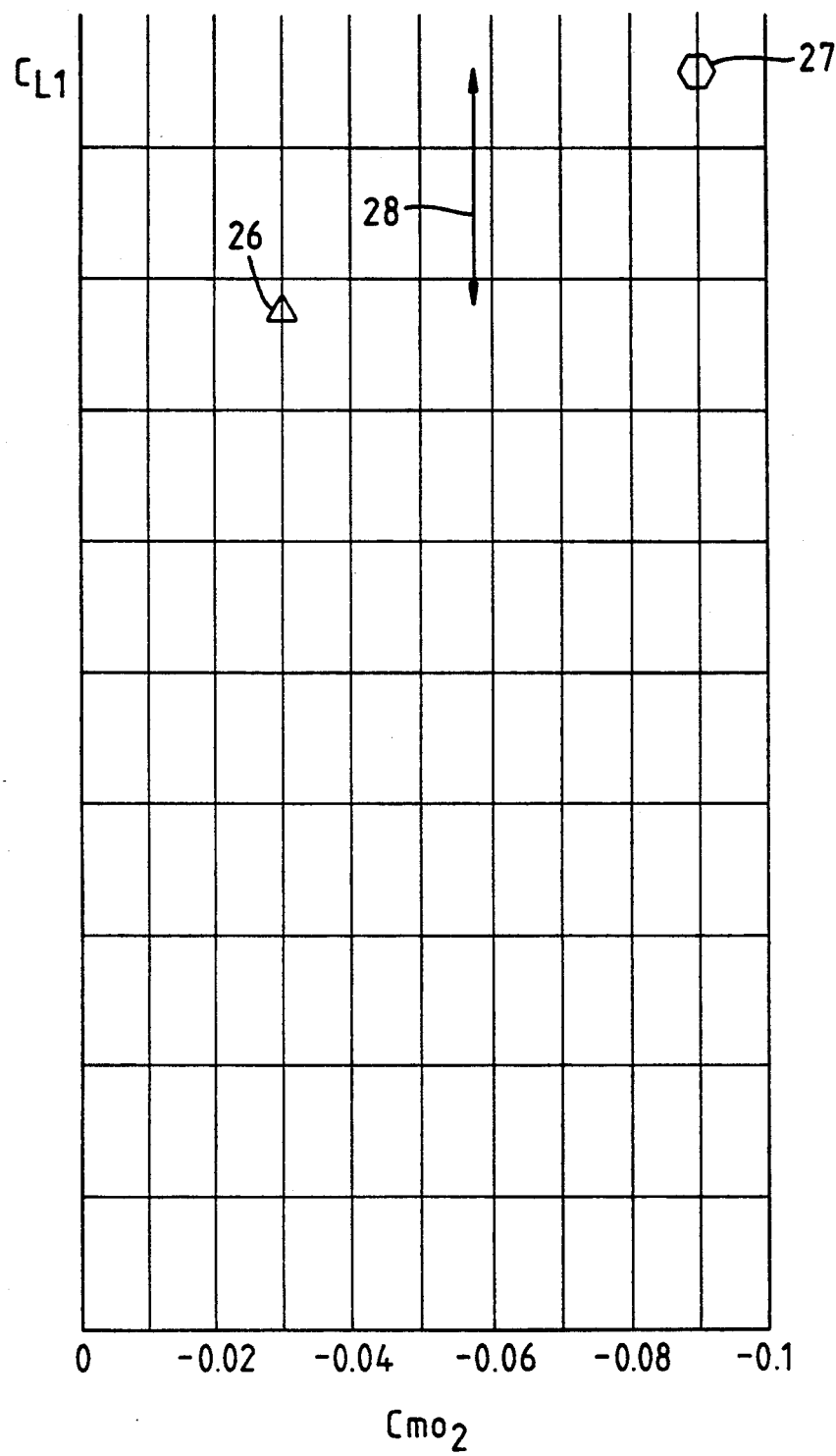
FIGS. 4 and 5A and 5B are graphs comparing operational characteristics of the prior art rotor blade and the rotor blade of this invention.

The operational value of this large improvement in moment capability is shown in FIG. 4 which plots the basic pitching moment coefficient $Cmo_2$ of the blade outboard region 17 against lift coefficient $C_L$ and shows the effect on usable $C_L$ values ($C_{L1}$) as the moment constraints are relaxed. $C_{L1}$ is directly proportional to the thrust capacity of a rotor having blades of this invention at the onset of retreating blade stall at a given advance ratio. The aerofoil section represented by numeral 26 is the section used in the outboard region of the prior art rotor blade having a negative basic pitching moment coefficient of $-0.03$ and the aerofoil section represented by numeral 27 has a negative basic pitching moment coefficient of $-0.09$ according to this invention.

FIG. 4 indicates that an increase of 3 times the $Cmo_2$ of the existing blade i.e. from $-0.03$ to $-0.09$, provides for the rotor blade employing the moment balance technique according to this invention an improvement in the retreating blade stall limited flight envelope of as much as 20 percent over the prior art blade as indicated at 28 in FIG. 4.

Figure 5A:
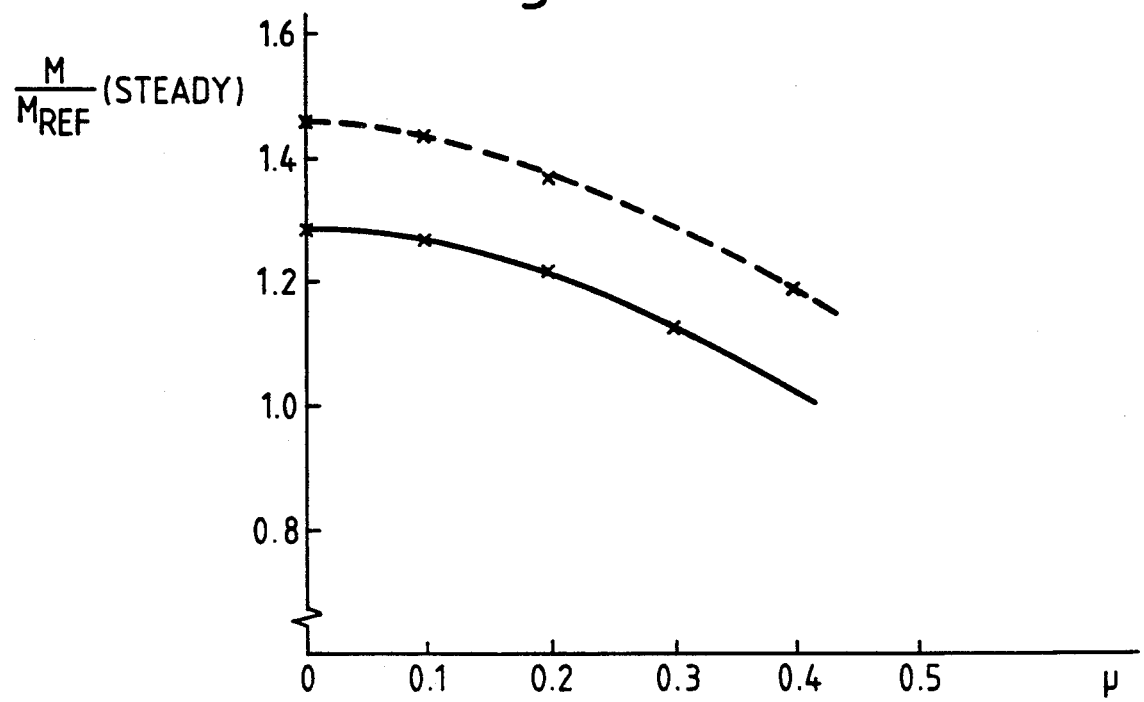

The consequences of the new technique for the two other harmonic components of moment, i.e. steady and twice-per-revolution ($2 \cos \psi$) for the two design solutions identified in FIG. 3 are shown in FIG. 5. Again $Cmo_T/Cmo_1 = 1.0$ is shown in full line and $Cmo_T/Cmo_1 = 0.5$ is shown in broken line. By forming ratios for the steady and twice-per-revolution components similar to equation 6, the steady and twice-per-revolution moments can be compared to those of the reference blade. FIG. 5A shows that the steady nose down twisting moment is higher than the reference low moment blade ($M/M_{REF}$ STEADY $> 1$) and that it decreases with increasing speed. This behaviour presents no operational problems and may be marginally advantageous to hover performance.

Figure 5B:
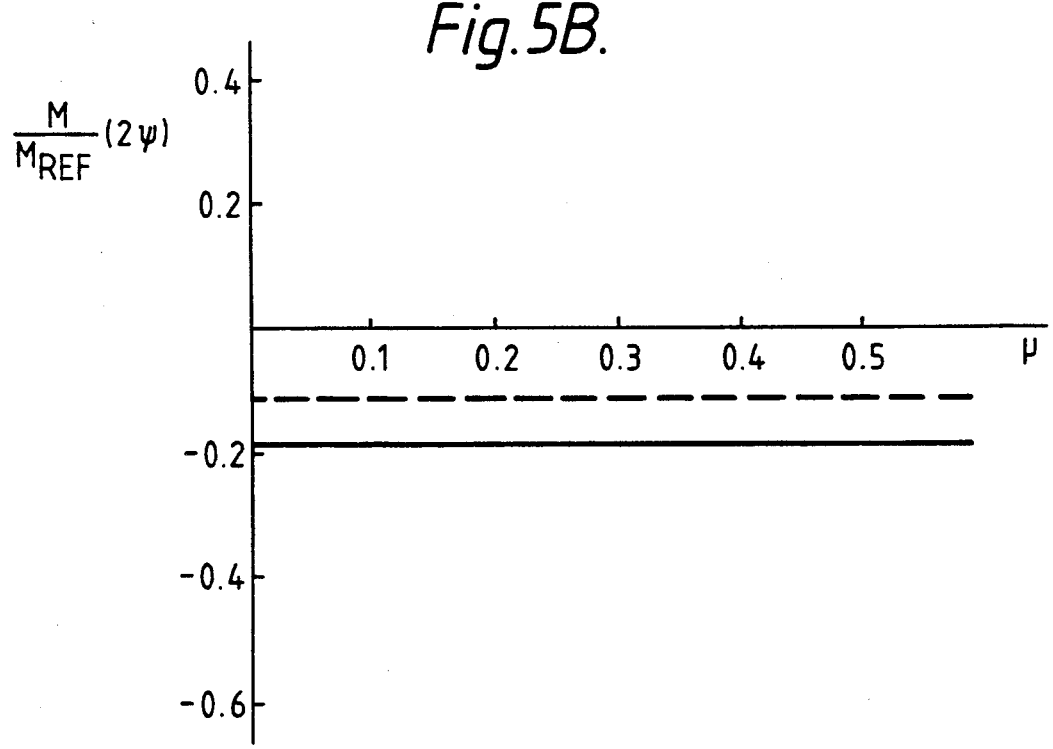

As shown in FIG. 5B, the twice-per-revolution moment is small in size relative to the reference low moment rotor blade ($M/M_{REF}2\psi \simeq -0.2$) and again, therefore, causes no operational problems.

The new moment balance technique of this invention can be used with any rotor blade having a tip portion 14 exhibiting a planform having good high angle of attack capability such as that of the rotor blade of GB-A-1538055. It has been shown that the technique, which places a reflex or nose up basic pitching moment coefficient aerofoil section in the tip portion in addition to that in an inboard region as taught by EP-A-0037633, allows much higher pitching moments to be tolerated in the critical outboard region just inboard of the tip portion which usually determines the onset of retreating blade stall in a helicopter rotor blade. The significantly higher pitching moment in the critical outboard region will enable rotor blades having improved retreating blade stall capability to be used providing an increase in the retreating blade stall envelope of around 20 percent thus providing a significant improvement in the performance of a helicopter on which the blades are fitted.

What is claimed is:

1. A helicopter rotor blade having a root end for attachment to a rotor head, a central portion of constant chord dimension and a tip portion at the end of the central portion and defining a rotor radius during operation, the tip portion having a forwardly extending leading edge portion, a rearwardly swept leading edge portion, a rearwardly swept extreme tip edge and a rearwardly swept trailing edge whereby a chord dimension of said tip portion is greater than the chord dimension of the central portion, an outboard region of the central portion having a negative basic pitching moment coefficient of absolute value not less than 0.02, an inboard region of said central portion having a positive basic pitching moment coefficient and said tip portion having a positive basic pitching moment coefficient between 0.5 and 1.0 times the basic pitching moment coefficient of the inboard region of the central portion.

2. A helicopter rotor blade having a root end for attachment to a rotor head, a central portion of constant chord dimension and a tip portion at the end of the central portion and defining a rotor radius during operation, the tip portion having a chord dimension greater than that of said central portion, an outward region of said central portion having a negative basic pitching moment coefficient of absolute value not less than 0.02, an inboard region of said central portion having a positive basic pitching moment coefficient and said tip portion having a positive basic pitching moment coefficient between 0.5 and 1.0 times the basic pitching moment coefficient of the inboard region of the central portion.

3. A rotor blade as claimed in claim 1, wherein said tip portion has a positive basic pitching moment coefficient between $+0.015$ and $0.03$, said inboard region has a positive basic pitching moment coefficient of about $+0.03$ and said outboard region has a negative basic pitching moment coefficient of about $-0.09$.

4. A rotor blade as claimed in claim 1, wherein said inboard region of the central portion extends to a rotor radial station of 0.65 R, the outboard region extends between 0.65 R and 0.86 R and said tip portion extends between 0.86 R and 0.95 R.

* * * * *